No. 722,547. PATENTED MAR. 10, 1903.
T. W. WHEELER.
STARTING OR STOPPING MECHANISM FOR WINDMILLS.
APPLICATION FILED OCT. 22, 1902.
NO MODEL.
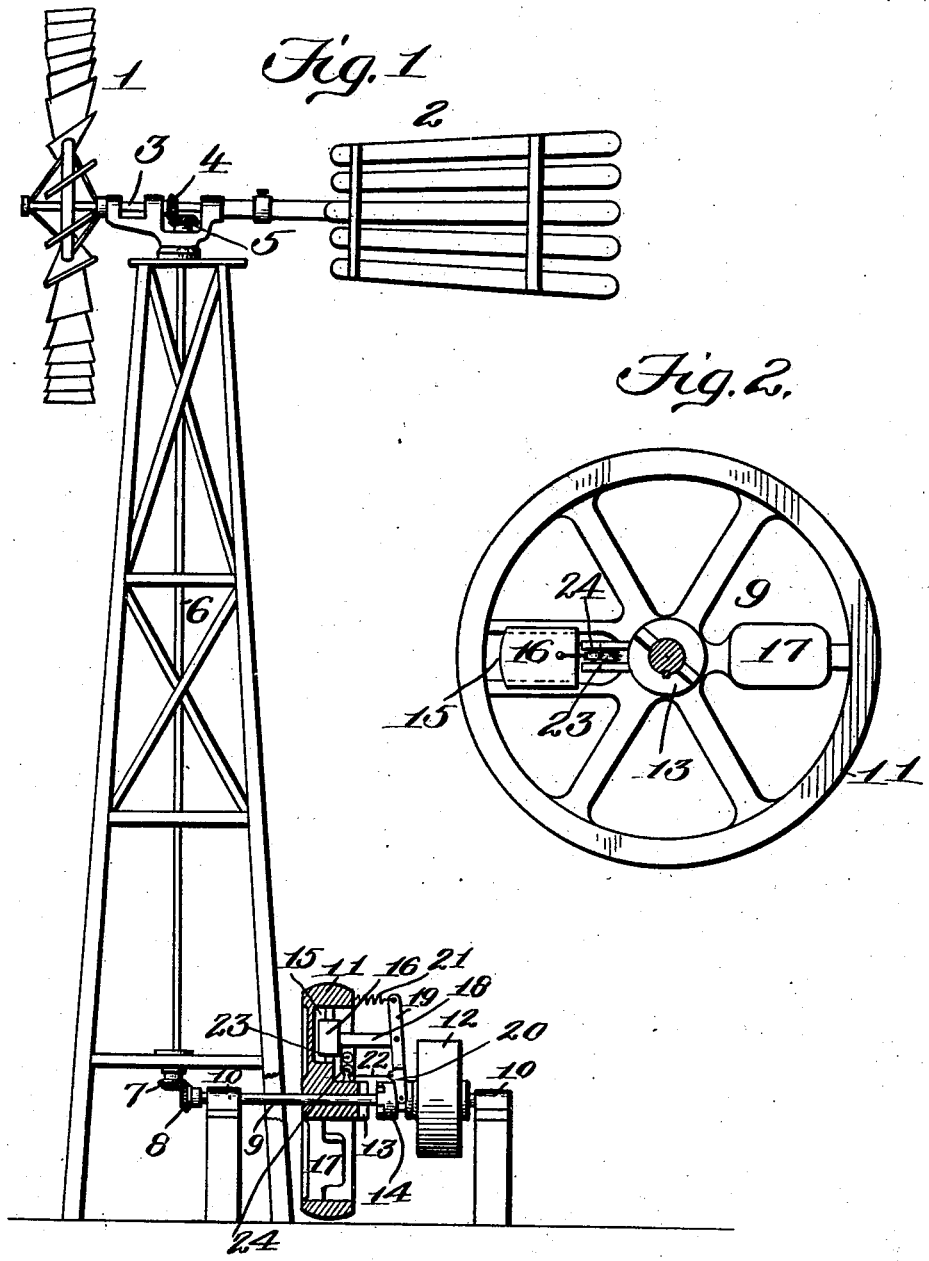
Witnesses
C. D. Kesler
Inventor
Thomas W. Wheeler
By James L. Norris
Atty.

UNITED STATES PATENT OFFICE.

THOMAS W. WHEELER, OF HYLTON, TEXAS.

STARTING OR STOPPING MECHANISM FOR WINDMILLS.

SPECIFICATION forming part of Letters Patent No. 722,547, dated March 10, 1903.

Application filed October 22, 1902. Serial No. 128,293. (No model.)

*To all whom it may concern:*

Be it known that I, THOMAS W. WHEELER, a citizen of the United States, residing at Hylton, in the county of Nolan and State of Texas, have invented new and useful Improvements in Starting or Stopping Mechanism for Windmills, of which the following is a specification.

This invention relates to starting and stopping mechanism for windmills, and has for its object to provide novel mechanism so constructed and arranged that normally the windmill will be out of gear with the machine to be driven thereby; but after the windmill has been thrown into operation and has acquired sufficient momentum it will be automatically thrown into gear with the mechanism which it is designed to actuate, and, conversely, after the velocity and force of the wind has decreased to such an extent as to be insufficient to actuate the driven mechanism the windmill and such mechanism will be automatically thrown out of gearing.

To such ends my invention consists in the features and in the construction, combination, and arrangement of parts hereinafter described, and particularly pointed out in the claims following the description, reference being had to the accompanying drawings, forming a part of this specification, wherein—

Figure 1 is a view in elevation, partially in section, of my improved device. Fig. 2 is a view in elevation of the fly-wheel.

Referring to the drawings, the numeral 1 indicates the wind-wheel of a windmill, and 2 the vane thereof, the two being constructed in any known, suitable, or preferred manner. On the shaft 3 of the wind-wheel is fixed a bevel-gear 4, which gears with a corresponding bevel-gear 5, that is fixed on one end of a rotatable shaft 6. On the other end of the shaft 6 is fixed a bevel-gear 7, that gears with a similar bevel-gear 8, fixed on one end of a driving-shaft 9, which is mounted in suitable fixed bearings 10.

On the shaft 10 is rigidly mounted a fly-wheel 11, and loosely mounted thereon is a loose pulley 12, the latter being adapted to be moved longitudinally on the shaft 10 and said shaft being adapted to rotate independently of said pulley. Fixed centrally to one face of the fly-wheel is one member 13 of a clutch, the corresponding member 14 of which is centrally fixed to the adjacent face of the pulley. The clutch may be constructed in any suitable or known manner, the specific construction of the clutch forming no part of the present invention, it only being essential that the two members forming the clutch be so constructed and arranged that when the two are brought into engagement they will rotate in unison, and thereby cause the pulley 12 to rotate in unison with the flywheel. The pulley 12 is adapted to be connected by a belt or sprocket-chain with a corresponding pulley, (not shown,) that is arranged to drive any suitable mechanism designed to receive its power from the windmill. It may be assumed, for example, that the pulley 12 will be connected in the manner described with the operating-shaft of a pump.

Formed in one face of the fly-wheel 11 is a radial recess 15, in which is movably arranged a weight 16, the relative sizes of the recess and weight being such that said weight may be moved radially in opposite directions in the recess for a limited distance. A balance-weight 17 is fixed to the fly-wheel at a point diametrically opposite the radially-movable weight, the purpose being to balance the flywheel on its axis of rotation and cause it to rotate evenly. Projecting from the inner face of the fly-wheel is an arm 18, which forms a fulcrum for a lever 19, which latter is pivoted intermediate its ends to the ends of said arm. One end of said lever is forked, as at 20, and loosely engages the clutch member 14, and the other end is connected to one end of a coiled spring 21, the opposite end of said coiled spring being attached to the fly-wheel 11, the arrangement being such that said spring normally operates to draw the free end of the lever 19 toward the fly-wheel, and thus move the clutch member 14 away from and out of engagement with the clutch member 13.

Attached to the shifting weight 16 is one end of a cord or other suitable flexible connection 22, said cord being loosely passed through a suitable aperture in the fly-wheel and guided about guide-pulleys 23 and 24, and is connected at its other end to the lever 19, before referred to, the length of the cord being such that when the weight 16 is shifted toward the periphery of the fly-wheel a sufficient distance the lever 19 will be turned upon its fulcrum in such a direction and to such an extent that the clutch member 14 will be drawn into engagement with the clutch member 13, drawing the pulley 12 with it, thereby causing the two clutch members to interlock and rotatively connecting the pulley and fly-wheel. Normally the spring 21 will hold the two clutch members out of engagement with one another and will also hold the shifting weight 16 toward the center of the fly-wheel.

Let it now be assumed that the wind-wheel be thrown into operation. For a time the wind-wheel will operate only to rotate the driving-shaft 9 and the fly-wheel 11, the pulley being loosely mounted on said shaft will remain in a state of rest. When, however, the momentum of the fly-wheel has acquired a sufficient force and weight to actuate the mechanism geared to the pulley 12, the shifting weight 16 will be thrown radially outward by centrifugal force and will, through the medium of the cord 22, draw the clutch member 14 into engagement with the clutch member 13, thereby rotatively connecting the pulley with the fly-wheel. The windmill will now continue to drive the mechanism connected with the pulley 12 until the velocity and force of the wind becomes insufficient to drive the parts at such speed as to maintain the weight 16 in the position to which it has been thrown by centrifugal force. When this occurs, the spring 21 will operate to shift the lever 19 so as to throw the two clutch members out of engagement, thereby throwing the pulley 12 and the mechanism actuated by the latter out of operation and also holding the shifting weight toward the center of the fly-wheel until the velocity of the wind will again acquire such force as to impart to the fly-wheel a sufficient momentum to overcome the inertia of the mechanism to be driven and once more place the latter in operation.

It will be obvious to the skilled mechanic that various alterations and modifications in the details of construction may be adopted without departing from the spirit of my invention, and I do not wish to confine myself to such details of construction except as hereinafter specifically pointed out in the annexed claims.

Having described my invention, what I I claim is—

1. The combination with a driven shaft, of a fly-wheel fixed on the shaft, a clutch member on the fly-wheel, a driving-pulley loosely mounted and longitudinally movable on said shaft, a clutch member on the driving-pulley, means actuated by the rotation of the fly-wheel for drawing the pulley toward the fly-wheel to throw said clutch members into operative engagement, and a spring arranged to throw the pulley and fly-wheel apart and out of operative engagement when the rotation of the shaft falls below a predetermined speed, substantially as described.

2. The combination with a driven shaft, of a fly-wheel fixed on the shaft, a driving-pulley loosely mounted and longitudinally movable on said shaft, said pulley being normally out of engagement with the fly-wheel, means carried by the fly-wheel and arranged to be actuated by the momentum of the latter to draw the pulley into operative engagement with the fly-wheel, and means arranged to throw the pulley and fly-wheel apart and out of operative engagement when the rotation of the shaft falls below a predetermined speed, substantially as described.

3. The combination with a driven shaft, of a fly-wheel fixed thereon and provided with a radial recess, a weight movably arranged in said recess, a pulley loosely mounted and movable longitudinally on said shaft, and means actuated by the centrifugal movement of said weight for drawing the pulley into operative engagement with the fly-wheel, substantially as described.

4. The combination with a driven shaft, of a fly-wheel arranged to be rotated thereby and provided with a radial recess, a weight movably arranged in said recess, a pulley, means actuated by the centrifugal movement of said weight for moving the said pulley into rotative engagement with the fly-wheel, and a balance-weight arranged on the fly-wheel diametrically opposite the shiftable weight, substantially as described.

5. The combination with a driven shaft, of a fly-wheel arranged to be rotated thereby and provided with a radial recess, a weight movably arranged in said recess, a pulley, clutch members fixed to the adjacent faces of the fly-wheel and pulley, and means actuated by the centrifugal movement of the shiftable weight for throwing said clutch members into engagement substantially as described.

6. The combination with a driven shaft, of a fly-wheel arranged to be rotated thereby and provided with a radial recess, a weight movably arranged in said recess, a pulley, clutch members fixed on the adjacent faces of the fly-wheel and pulley, and flexible connections between said weight and one of said clutch members and arranged to throw said clutch members into operative engagement when said weight is thrown outward by centrifugal movement, substantially as described.

7. The combination with a driven shaft, of a fly-wheel fixed on the shaft and provided with a radial recess, a weight movably arranged in said recess, a pulley loosely mounted and longitudinally movable on said shaft, means actuated by the centrifugal movement of said weight for drawing the said pulley into operative engagement with the fly-wheel, and a spring for normally holding said pulley and fly-wheel out of operative engagement, substantially as described.

8. The combination with a driven shaft, of a fly-wheel fixed on the shaft and provided with a radial recess, a weight movably arranged in said recess, a pulley loosely mounted and longitudinally movable on said shaft, a lever fulcrumed on a support carried by the fly-wheel and loosely connected at one end with the pulley, a connection between the weight and said lever for drawing the pulley into operative engagement with the fly-wheel when the weight is thrown outward by centrifugal force, and a spring arranged to normally hold the pulley and fly-wheel out of engagement, substantially as described.

In testimony whereof I have hereunto set my hand in presence of two subscribing witnesses.

THOMAS W. WHEELER.

Witnesses:
MORUS B. HOWARD,
WILLIAM G. BRADFORD.